US006423897B1

(12) United States Patent
Roesch et al.

(10) Patent No.: US 6,423,897 B1
(45) Date of Patent: Jul. 23, 2002

(54) ELECTRICAL UTILITY BOX

(75) Inventors: Mark A. Roesch, Brecksville; David A. Maccarone, Hudson, both of OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/626,478

(22) Filed: Jul. 26, 2000

Related U.S. Application Data
(60) Provisional application No. 60/147,882, filed on Aug. 9, 1999.

(51) Int. Cl.[7] ................................................ H02G 3/08
(52) U.S. Cl. .......................... 174/50; 174/53; 220/4.02; 439/535; 248/906
(58) Field of Search ............................. 174/48, 50, 53, 174/54, 58, 60, 63, 64, 17 R; 220/3.6, 3.8, 4.02, 3.3, 3.2; 248/906; 439/535; 411/372.5, 429, 431

(56) References Cited

U.S. PATENT DOCUMENTS

| | | | |
|---|---|---|---|
| 4,082,915 A | 4/1978 | Silver | |
| 4,105,862 A | 8/1978 | Hoehn | |
| 4,134,636 A | * 1/1979 | Kleinatland et al. | ...... 174/58 X |
| 4,151,363 A | 4/1979 | Nichols | |
| 4,211,464 A | 7/1980 | Lee | |
| 4,244,483 A | 1/1981 | Bauer et al. | |
| 4,247,738 A | 1/1981 | Bonato | |
| 4,265,365 A | 5/1981 | Boteler | |
| 4,288,655 A | 9/1981 | Lass | |
| 4,335,271 A | 6/1982 | Haslbeck | |
| 4,389,535 A | 6/1983 | Slater et al. | |
| 4,414,427 A | 11/1983 | Slater et al. | |
| 4,419,537 A | 12/1983 | Leep et al. | |
| 4,424,406 A | 1/1984 | Slater et al. | |
| 4,459,429 A | 7/1984 | Docimo | |
| 4,591,658 A | 5/1986 | Bauer et al. | |
| D286,766 S | 11/1986 | Gallusser et al. | |
| D286,768 S | 11/1986 | Borsh et al. | |
| 4,785,140 A | 11/1988 | Adams et al. | |
| 4,794,207 A | 12/1988 | Norberg et al. | |
| 4,896,784 A | 1/1990 | Heath | |
| 5,073,681 A | * 12/1991 | Hubben et al. | ........... 174/65 R |
| 5,216,203 A | 6/1993 | Gower | |
| D341,353 S | 11/1993 | O | |
| 5,272,279 A | 12/1993 | Filshie | |
| 5,300,731 A | 4/1994 | DeBaratolo, Jr. et al. | |
| D360,620 S | 7/1995 | Gehrs et al. | |
| 5,579,938 A | 12/1996 | Bourassa et al. | |
| 5,623,124 A | 4/1997 | Chien | |
| 5,679,924 A | 10/1997 | Young et al. | |
| 5,998,732 A | * 12/1999 | Caveney et al. | ............... 174/48 |

FOREIGN PATENT DOCUMENTS

GB 2211364 * 6/1989 ................... 174/58

* cited by examiner

Primary Examiner—Dean A. Reichard
Assistant Examiner—Dhiru R Patel
(74) Attorney, Agent, or Firm—Jones, Day, Reavis & Pogue

(57) ABSTRACT

An electrical utility box is configured to contain an electrical device. The box includes a bottom wall, two opposing side walls, two opposing end walls, a mounting boss, and a shield structure. The mounting boss has a bore configured to receive a fastener that fastens the electrical device to the box. The shielding structure is configured to block an uninsulated wire from contacting a portion of the fastener that protrudes from an open lower end of the bore.

14 Claims, 5 Drawing Sheets

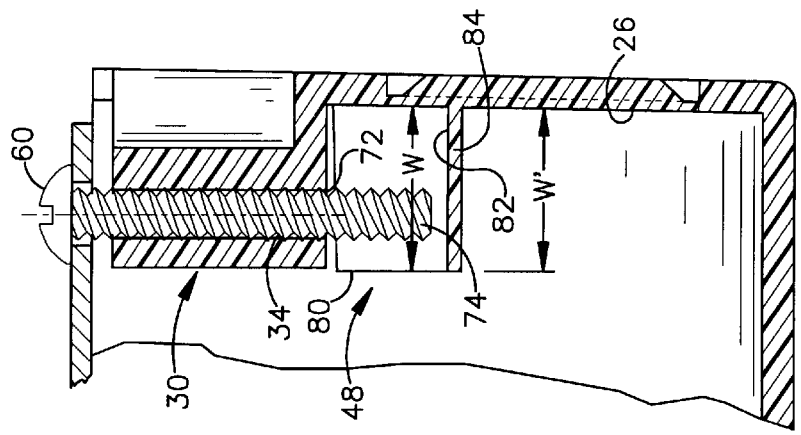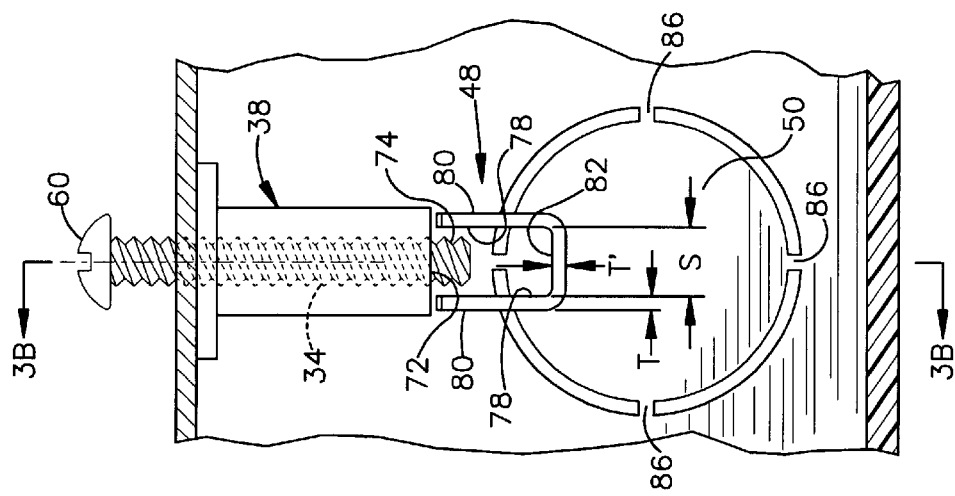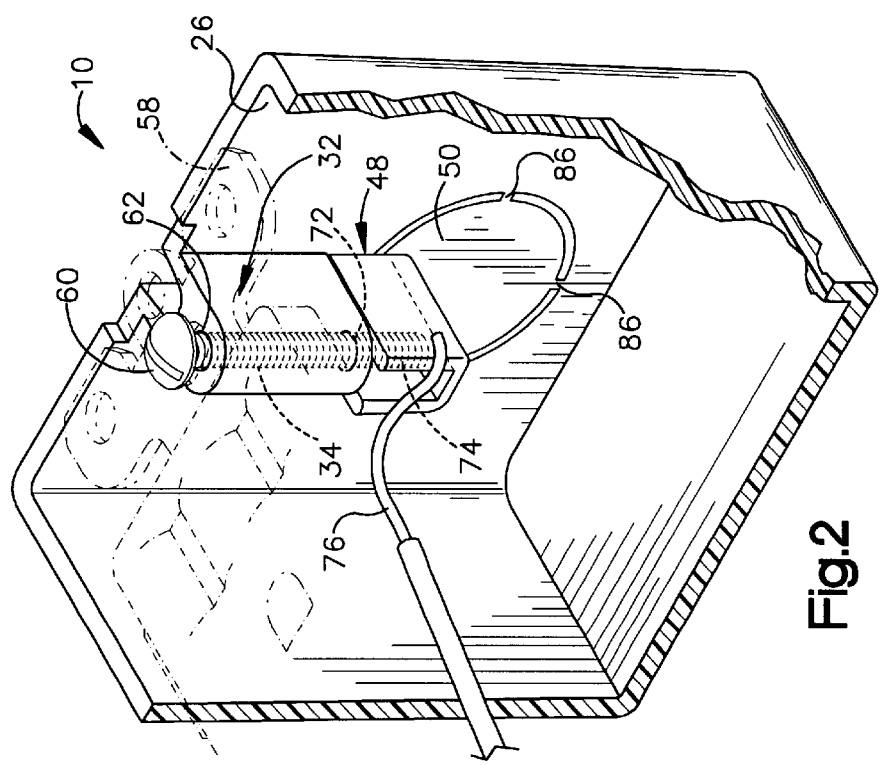

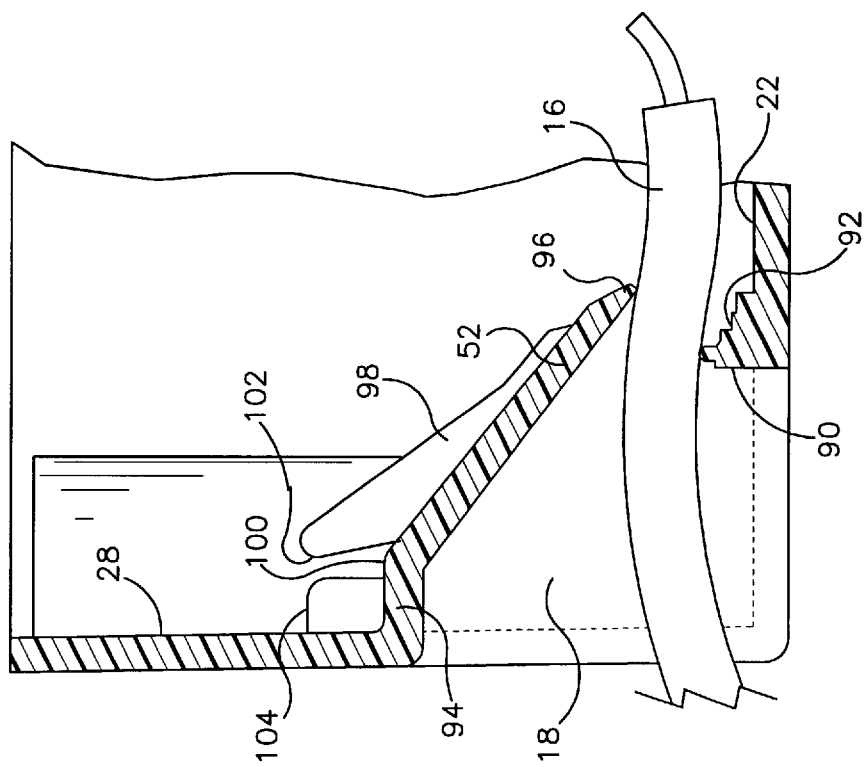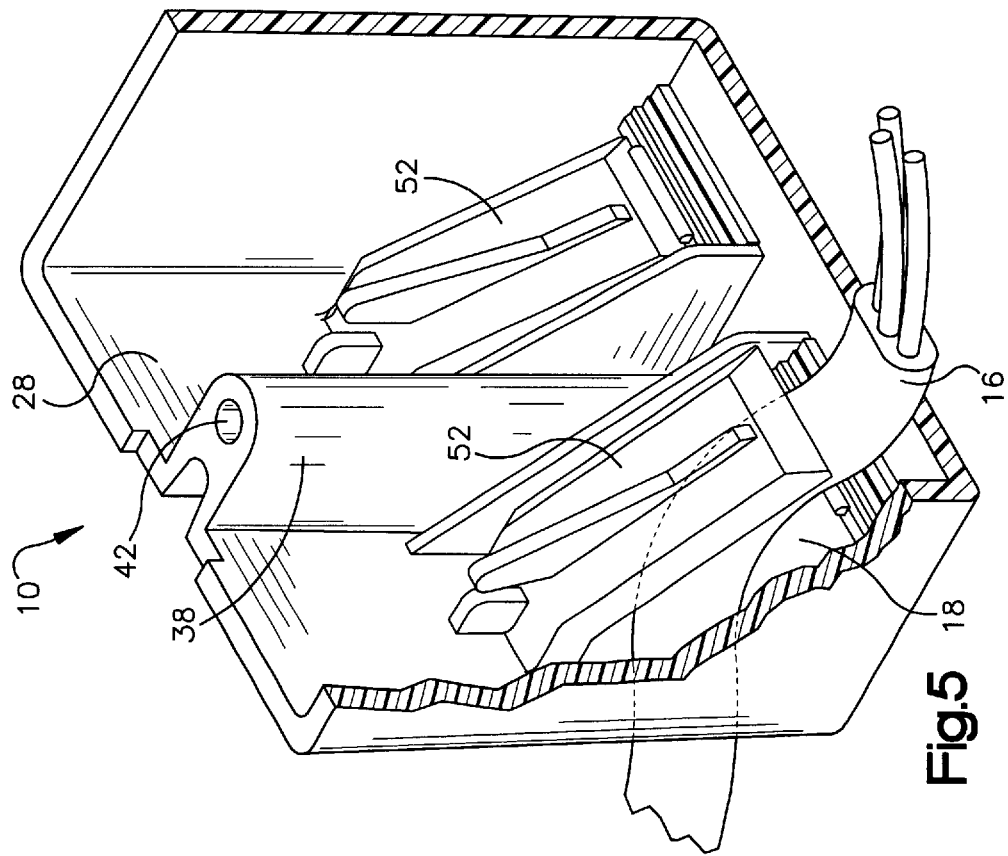

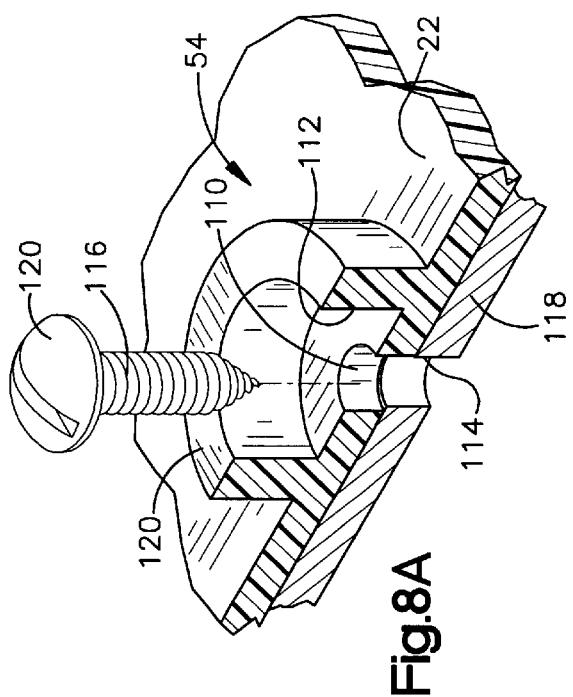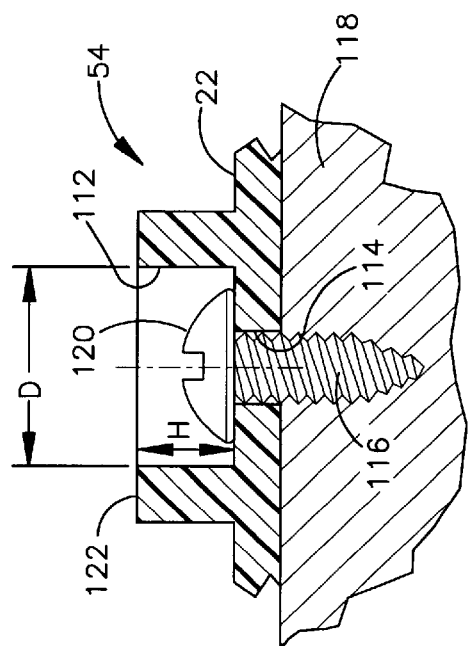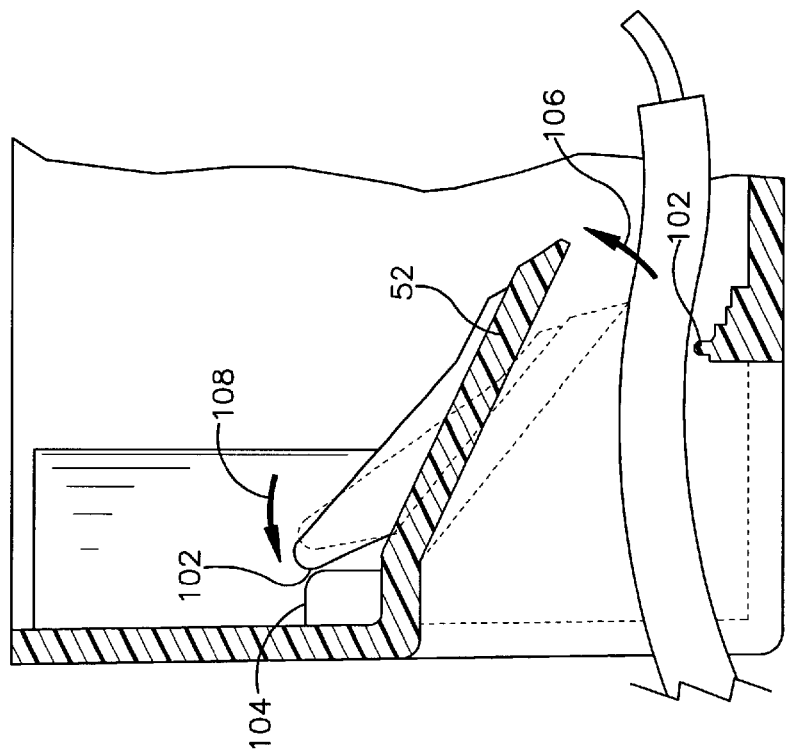

ELECTRICAL UTILITY BOX

This application claims priority from provisional application No. 60/147,882, filed Aug. 9, 1999.

FIELD OF THE INVENTION

The present invention relates to electric utility boxes that house electrical devices.

BACKGROUND OF THE INVENTION

An electrical utility box is typically a rectangular, open-faced box mounted in a wall. It serves to house an electrical device, such as an electrical receptacle or switch or a GFI (ground fault interrupter). Electrical wiring, such as a flexible cable and wiring through rigid conduit, is routed into the utility box via openings in the box walls. The wiring is connected to the electrical device in the box.

SUMMARY OF THE INVENTION

The present invention is an electrical utility box configured to contain an electrical device. In accordance with a principal feature of the invention, the box comprises a bottom wall, two opposing side walls, first and second opposing end walls, a mounting boss and a shield structure. The mounting boss has a bore configured to receive a fastener that fastens the electrical device to the box. The shield structure is configured to block an uninsulated wire from contacting a protruding portion of the fastener that protrudes from an open lower end of the bore.

In a preferred embodiment of the invention, the shield structure includes a pair of opposed shielding surfaces. The shielding surfaces are located adjacent to an open lower end of the bore, spaced from each other with reference to the protruding portion of the fastener so as to receive the fastener closely between the shielding surfaces. An additional shielding surface, below the pair of shielding surfaces, prevents the fastener from protruding downward beyond the pair of shielding surfaces. The shield structure is connected directly to a knockout on the first end wall, so that the shield structure is removed with the knockout when the knockout is removed.

In accordance with another principal feature of the present invention, the mounting boss projects from one side surface of the first end wall. A slot along an opposite side surface of the first end wall extends downward from a top edge of the box. The slot is configured to receive a second fastener that fastens the cover over the electrical device in the box. The bore and the slot are preferably centered on axes that are equidistant from the side walls Another principal feature is a flexible cable clamp. The box has a cable opening partially defined by the first end wall and partially defined by the bottom wall. An edge of the cable opening is defined by a ridge along the bottom wall. The clamp projects across the cable opening and has a free end configured to apply a clamping force to hold a cable against the ridge. Preferably, the second end wall has a knockout, opposing the clamp on the first end wall.

BRIEF DESCRIPTION OF THE DRAWINGS

FIG. 2 is a perspective view of a first end wall of the box of FIG. 1.

FIG. 3A is a view of parts shown in FIG. 2.

FIG. 3B is a view taken on line 3B—3B of FIG. 3A.

FIG. 5 is a perspective view of a second end wall of FIG. 1.

FIG. 6 is a partial sectional view of parts shown in FIG. 5.

FIG. 7 is a view similar to FIG. 6, showing parts in different positions.

FIG. 8A is a sectional perspective view of a part of the box of FIG. 1.

FIG. 8B is a sectional side view similar to FIG. 8A.

DESCRIPTION OF A PREFERRED EMBODIMENT

Figure 1:
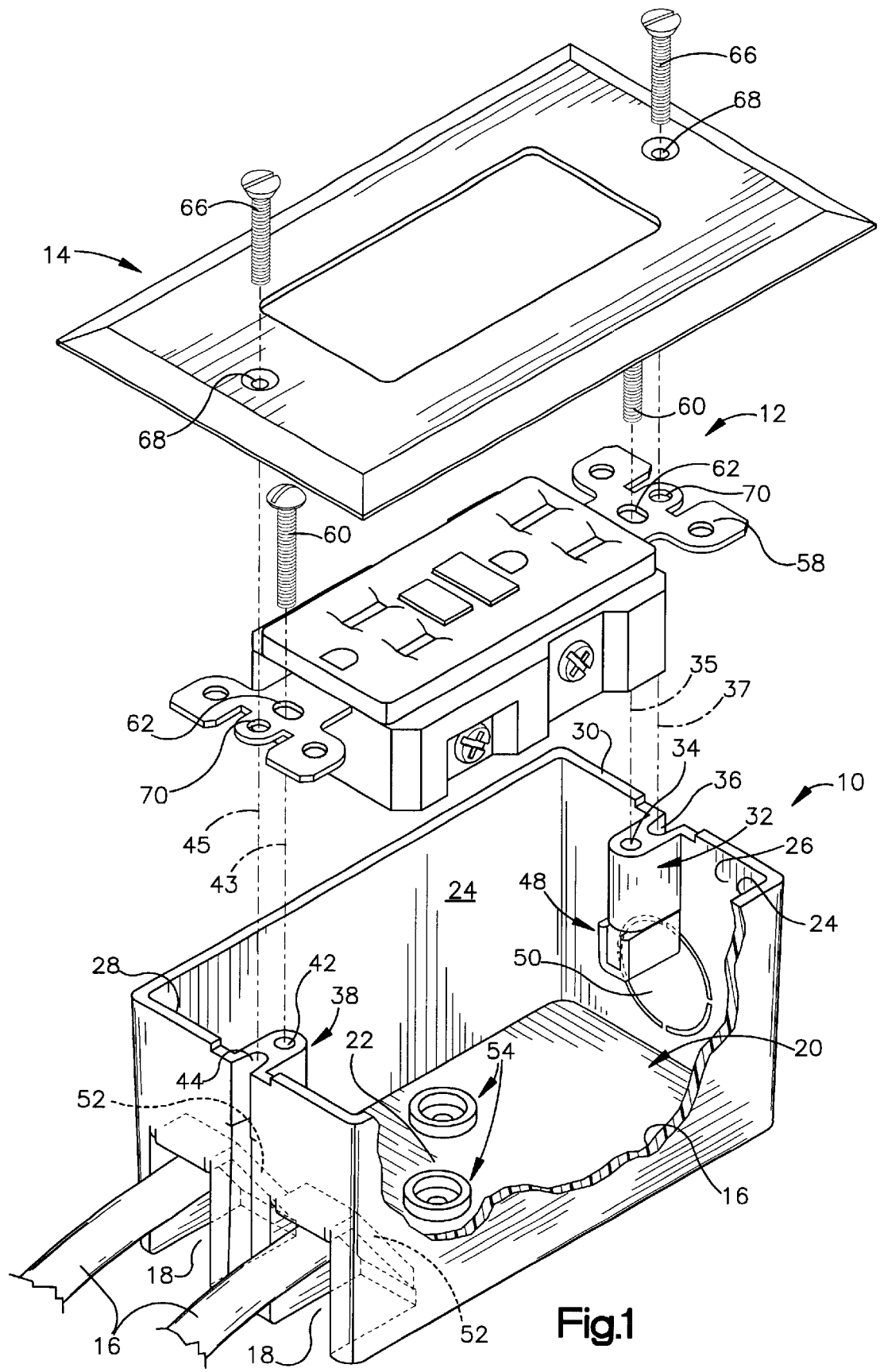
FIG. 1 is an exploded perspective view of a utility box, comprising a preferred embodiment of the present invention, and an electrical device and a cover.

FIG. 1 is a perspective view of a utility box 10 comprising a preferred embodiment of the present invention. An electrical device 12, in this case a GFI (ground fault interrupter), is mounted to the box 10, and a cover 14 is mounted to the electrical device 12. The box 10 is typically installed in a wall. Flexible cables 16 are fed through cable openings 18 and are connected to the electrical device 12 within the box 10.

As shown in FIG. 1, the box 10 has a box cavity 20 bounded by a bottom wall 22, two opposing side walls 24, a first end wall 26, an opposing second end wall 28, and a top edge 30. The box 10 is molded as a one-piece plastic structure; "one-piece" meaning the structure is molded as a single unit—not as separate but joined elements.

A first mounting boss 32 projects inward from the first end wall 26, and has a smooth circular bore 34 centered on an axis 35 that is centered between the side walls 24. A first slot 36 is formed as a recess along an outside surface of the first end wall 26, directly outward from the first mounting boss 32. The first slot 36 is centered on an axis 37 that also is centered between the side walls 24. The axes 35 and 37 in the preferred embodiment are thus equidistant from the side walls 24. Similarly, a second mounting boss 38 (shown in FIGS. 1 and 5) projects inward from the second end wall 28, and has a smooth circular bore 42 centered on an axis 43 that is centered between the side walls 24. A second slot 44 is formed as a recess in the second end wall 28, directly outward from the second mounting boss 38. The second slot 44 is centered on an axis 45 that also is centered between the side walls 24. Consequently, the first mounting boss 32, the second mounting boss 38, the first slot 36 and the second slot 44 are centered on axes 35, 37, 43 and 45 that are all equidistant from the side walls 24 and extend vertically downward from the top edge 30.

Just below the first mounting boss 32, a shielding structure 48 projects inward from the first end wall 26. Behind the shielding structure 48, on the first end wall 26, is a knockout 50 that is removable to define an opening through which a male fitting or a conduit connector can enter the box opposite the cables 16.

The second end wall 28 has the two cable openings 18, through which the cables 16 can enter the box cavity 20, and two corresponding cable clamps 52 to clamp the cables 16 in place.

Two mounting hole sections 54 in the bottom wall 22 are for fastening the box 10 to a structural support (such as a wall stud) behind the bottom wall 22.

The electrical device 12 has a yoke 58 for securing the electrical device 12 to the box 10 with two fasteners 60, in this case two yoke screws. The yoke screws 60 are inserted through two yoke-mounting holes 62 and are screwed into the two bores 34 and 42 in the box 10.

The cover 14 is disposed over, and secured to, the electrical device 12 using two fasteners, in this case two cover screws 66. The cover screws 66 pass through two cover holes 68 in the cover 14, and are screwed into two corresponding screw-threaded cover-mounting holes 70 in the yoke 58. The slots 36 and 44 are configured to receive the cover screws 66.

FIG. 2 shows an enlarged perspective view of the first end wall 26 of FIG. 1, as viewed from inside the box 10, showing the first mounting boss 32. The yoke-mounting screw 60 is shown passing through the yoke-mounting hole 62 of the yoke 58 and screwed into the bore 34. The bore 34 has a lower open end 72. A protruding portion 74 of the yoke screw 60 extends beyond the lower open end 72. The shielding structure 48 is configured to block an uninsulated wire 76 from contacting the protruding portion 74 of the yoke screw 60.

Referring to FIGS. 2, 3A and 3B, the shielding structure 48 includes a pair of opposed shielding surfaces 78. The shielding surfaces 78 project from the first end wall 26, adjacent to the open lower end 72 of the bore 34. In the preferred embodiment of the invention, each shielding surface 78 is located on a wall 80 having a thickness T (FIG. 3A) and a width W (FIG. 3B). The shielding surfaces 78 are spaced from each other, with a spacing S selected with reference to the protruding portion 74 of the yoke screw 60 so as to receive the screw's protruding portion 74 closely between the shielding surfaces 78. The width W of the shielding surfaces 78 is sufficiently large that the shielding surfaces 78 project beyond the protruding portion 74 of the yoke screw 60 so as to block the uninsulated wire 76 (FIG. 2) from contacting the screw's protruding portion 74.

The shielding structure 48 has an additional lower shielding surface 82 located beneath the shielding surfaces 78, to prevent the yoke screw 60 from projecting below the shielding surfaces 78 if the yoke screw 60 were too long. This ensures that the shielding structure 48 will fully block the uninsulated wire 76 from reaching the protruding portion 74 of the screw 60. The lower shielding surface 82 forms a portion of a wall 84 having a thickness T' (FIG. 3A) that is less than its width W' (FIG. 3B), and completes a "U-shape" with the two surfaces 78.

Figure 4:
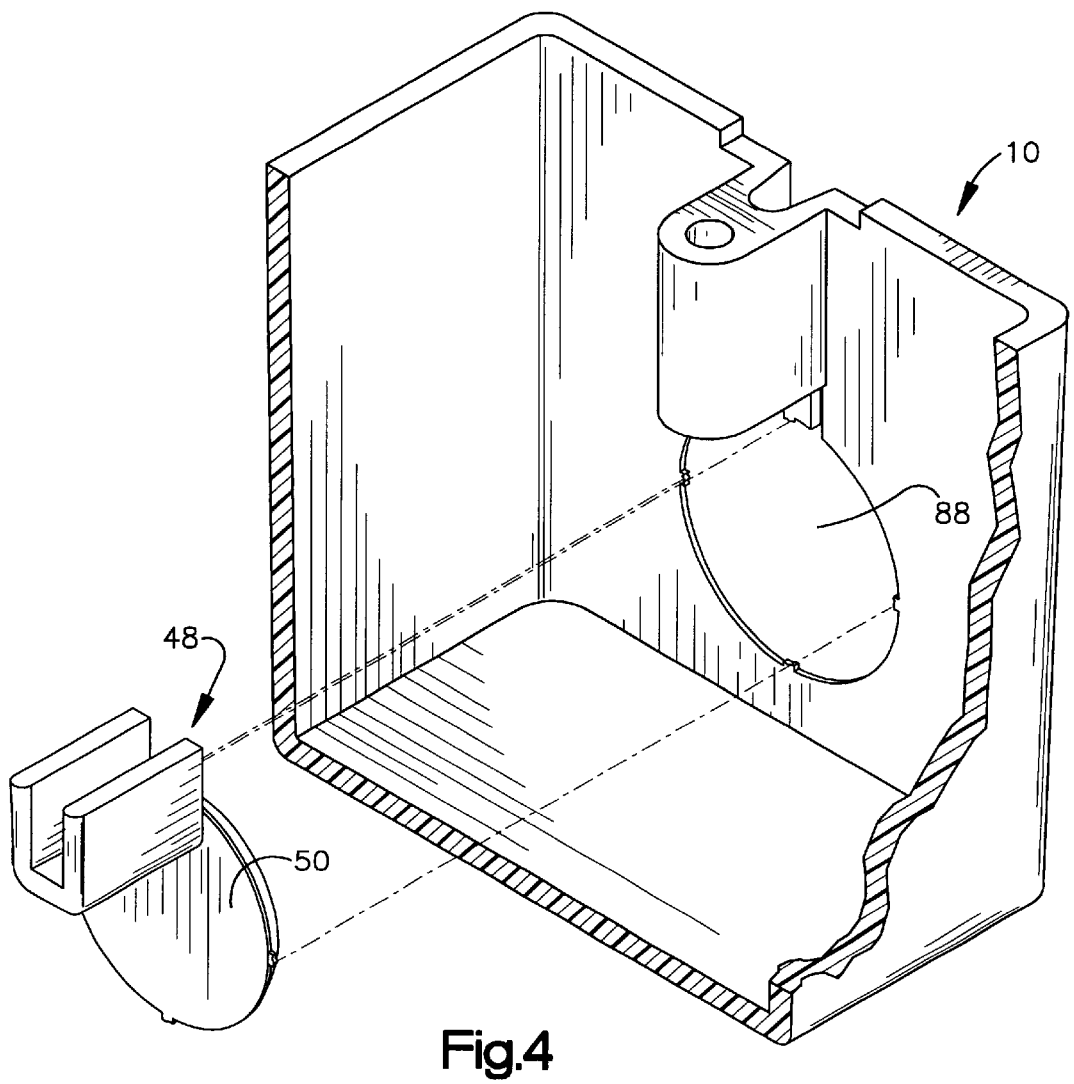
FIG. 4 is a perspective view of the first end wall shown in FIG. 1, with a knockout removed.

As shown in FIG. 2, the knockout 50 on the first end wall 26 is located behind the shielding structure 48. The knockout 50 is held in place by four snap-off tabs 86, and can be removed by punching (knocking) it out with a tool, such as a screwdriver. The shielding structure 48 is connected directly to the knockout 50 and is not connected directly to the remainder of the first end wall 26. Therefore, the shielding structure 48 is removed with the knockout 50 when the knockout 50 is removed. FIG. 4 shows the portion of the box 10 shown in FIG. 2, with the knockout 50 removed. By the shielding structure 48 being connected to, and removed along with, the knockout 50, the box 10 is left with an access opening 88 that is unobstructed by the shielding structure 50 and can thus receive a conduit connector and lock nut.

FIG. 5 shows an enlarged perspective view of the second end wall 28 of FIG. 1, as viewed from inside the box 10. Both cable openings 18 (only one of which is visible in FIG. 5) are alike, and both clamps 52 are alike. The cable 16 passes through one of the cable openings 18 and is clamped by the corresponding clamp 52. FIG. 6 shows a side sectional view of the second end wall 28 of FIG. 1, cut vertically at the horizontal center of one of the clamps 52. The cable opening 18 is located at the corner of the second end wall 28 and the bottom wall 22. An edge 90 of the cable opening 18 is defined by an elevated ridge 92 extending along the bottom wall 22. The clamp 52 projects across the cable opening 18. The clamp 52 has a fixed end 94, connected as one-piece to the second end wall 28, and an opposite free end 96, directly above the ridge 92. As the clamp 52 flexibly presses down on the cable 16, the cable 16 is squeezed between the free end 96 and the ridge 92, and the free end 96 applies clamping force to hold the cable 16 against the ridge 92.

A reinforcing rib 98 extends along a majority of the length of the clamp 52. The portion of the clamp 52 that is beneath the rib 98 is stiffened by the rib 98, so that the area of flexibility and bending is concentrated in the un-reinforced area 100 that has no reinforcing rib.

When the clamp 52 is flexed upward to a specified extent, a rib edge 102 of the rib 98 abuts a stop member, in this case a small rib 104 connected to the second end wall 28. This prevents excessive flexing. This feature is illustrated in FIG. 7, showing a profile of the clamp 52 being flexed upward (as indicated by an arrow 106), whereby the rib edge 102 swings toward the small rib 104 (as indicated by an arrow 108) and abuts the small rib 104 to prevent further flexing.

An enlarged view of one of the mounting hole sections 54 of FIG. 1 is shown in FIG. 8A in cutaway perspective view and in FIG. 8B in cutaway side view. The mounting hole section 54 has a mounting hole 110 in the bottom wall 22 surrounded by an annular wall 112. The mounting hole 110 has round hole edge 114, and is configured to receive a fastener 116 for mounting the box to a structure 118, such as a stud. The fastener 116, in this case a screw, has a fastener head 120. The annular wall 112 projects upward from the bottom wall 22, concentrically-surrounding, and spaced from, the hole edge 114. The annular wall 112 has a height H, a diameter D, and a top edge 122, and is configured by selection of its height H and diameter D to shield the fastener head 120 from contact with an uninsulated wire. To that end, the diameter D is selected so that the annular wall 112 is close to the fastener head 120, and the height H is selected so that the top edge 122 projects above the fastener head 120.

The invention has been described with reference to a preferred embodiment. Those skilled in the art will perceive improvements, changes and modifications as taught by the foregoing description. Such improvements, changes and modifications are intended to be within the scope of the claims.

What is claimed is:

1. An electrical utility box configured to contain an electrical device that is covered by a cover, said box comprising:
    a bottom wall;
    two opposing side walls;
    first and second opposing end walls;
    a top edge;
    a mounting boss projecting from one side surface of said first end wall, with a bore configured to receive a first fastener that fastens the electrical device to said box; and
    a slot along an opposite side surface of said first end wall, extending downward from said top edge and configured to receive a second fastener that fastens the cover.

2. A box as defined in claim 1 wherein said bore and said slot are centered on axes that are equidistant from said side walls.

3. A box as defined in claim 1 further having:
a knockout in said first end wall;
a cable opening at said second end wall; and
a cable clamp configured to engage a cable through said cable opening.

4. A box as defined in claim 1 wherein said box is a one-piece molded plastic structure.

5. A box as defined in claim 1 wherein said one side surface is an inside surface of said first end wall, and said opposite side surface is an outside surface of said first end wall.

6. An electrical utility box configured to contain an electrical device, said box comprising:
a bottom wall;
two opposing side walls;
first and second opposing end walls;
a cable opening, partially defined by said first end wall and partially defined by said bottom wall, having an edge defined by a ridge along said bottom wall; and
a flexible clamp for securing a cable that extends through said cable opening;
said clamp projecting across said cable opening and having a free end configured to apply a clamping force to hold said cable against said ridge.

7. A box as defined in claim 6 wherein said second end wall has a knockout.

8. A box as defined in claim 6 wherein said box is a one-piece molded plastic structure.

9. An electrical utility box configured to contain an electrical device, said box comprising:
a bottom wall;
two opposing side walls;
first and second opposing end walls;
a mounting boss with a bore configured to receive a fastener that fastens the electrical device to said box, said bore having an open lower end; and
a shield structure configured to block an uninsulated wire from contacting a protruding portion of the fastener that protrudes from said open lower end of said bore;
wherein said shield structure has a pair of opposed shielding surfaces, adjacent said open lower end of said bore, spaced from each other with reference to the protruding portion of the fastener so as to receive the fastener closely between said shielding surfaces.

10. A box as defined in claim 9 wherein said shielding surfaces project from said first end wall beyond the protruding portion of the fastener.

11. A box as defined in claim 10 wherein said box is a one-piece molded plastic structure.

12. A box as defined in claim 11 wherein each of said shielding surfaces is located on a respective wall having a thickness that is less than its width.

13. A box as defined in claim 12 wherein said shield structure further includes an additional shielding surface, below said pair of shielding surfaces, configured to prevent the fastener from protruding downward beyond said pair of shielding surfaces.

14. An electrical utility box configured to contain an electrical device, said box comprising:
a bottom wall;
two opposing side walls;
first and second opposing end walls;
a mounting boss with a bore configured to receive a fastener that fastens the electrical device to said box, said bore having an open lower end; and
shield structure configured to block an uninsulated wire from contacting a protruding portion of the fastener that protrudes from said open lower end of said bore;
wherein said first end wall has a knockout; and
said shield structure is connected directly to said knockout and is free of a direct connection to the remainder of said first end wall, whereby said shield structure is removed with said knockout when said knockout is removed.

* * * * *

UNITED STATES PATENT AND TRADEMARK OFFICE
CERTIFICATE OF CORRECTION

PATENT NO. : 6,423,897 B1
DATED : July 23, 2002
INVENTOR(S) : Roesch et al.

It is certified that error appears in the above-identified patent and that said Letters Patent is hereby corrected as shown below:

Column 6,
Line 27, insert -- a -- before the word shield.

Signed and Sealed this

Twelfth Day of November, 2002

Attest:

Attesting Officer

JAMES E. ROGAN
Director of the United States Patent and Trademark Office